United States Patent Office 3,257,417
Patented June 21, 1966

3,257,417
PROCESS FOR PRODUCING FURAN BY DECARBONYLATING FURFURAL
Andrew P. Dunlop, Riverside, and George W. Huffman, Crystal Lake, Ill., assignors to The Quaker Oats Company, Chicago, Ill., a corporation of New Jersey
No Drawing. Filed June 27, 1963, Ser. No. 290,939
5 Claims. (Cl. 260—346.1)

This invention relates to a liquid phase process for the conversion of furfural to furan, and more specifically to the liquid phase decarbonylation of furfural in the presence of a palladium catalyst and calcium acetate.

In 1952 H. E. Eschinazi (Bulletin de la Societe Chemique, 5th series, vol. 19, pages 967–969) described a process for the liquid phase decarbonylation of furfural by boiling liquid furfural in the presence of a palladium catalyst on a sodium carbonate-treated barium sulfate support. In this description, Eschinazi refers to a preceding publication [J.A.C.S. 72³, pp. 5651–54 (1950)] for the method used in preparing the catalyst. In the French article Eschinazi also discloses continuous distillation of the products of decarbonylation, and that it is essential to use an atmosphere of nitrogen or $CO_2$ over the reaction medium.

In U.S. Patent No. 3,007,941, which relates to a liquid phase decarbonylation of furfural, H. B. Copelin et al. report that "research studies have confirmed the findings of H. E. Eschinazi." In that patent Copelin et al. also refer to the use of a palladium catalyst for the decarbonylation of liquid furfural, and they refer to production rate studies, which are extrapolated to infinite time by some undisclosed calculations in order to produce numbers called "extrapolated catalyst productivity." In order to actually achieve the hypothetical extrapolated catalyst productivity utilizing the process described by Copelin et al., the reaction would have to be continued to the end of time, i.e., "to infinite time." It is also evident that in Example 3 of this patent the extrapolated portion (i.e., about 40%) of this extrapolated productivity would have been produced at a rate less than about 13% of the initial rate. We have been able to approximately duplicate some of the actual results reported by Copelin et al., and we have attempted to continue production of furan beyond that point in accordance with that process. When we attempted to continue production of furan in this manner, we discovered that not only did the production rate soon fall off to essentially zero, but also the reactor contents became a solid resin mass on several occasions. We made no attempt to duplicate the calculations by which the actual results were extrapolated to infinite time to obtain the "extrapolated catalyst productivity" because the calculation method was not disclosed.

According to Copelin et al. the process described by them is "preferably carried out in the substantial absence of water. To accomplish this, catalyst, furfural, and basic salt should be introduced in a substantially dry state." However, furfural is produced by treatment of agricultural residue and by-products with aqueous acid, followed by steam distillation. Hence the furfural as first produced is wet indeed. Complete removal of water from furfural adds significantly to the cost. Moreover, the prior art teaches purification of furfural by distillation of furfural from aqueous sodium carbonate. It also teaches that furfural containing water is more storage stable than anhydrous furfural. A process for producing furan which provides high productivity rates and high productivity using furfural which contains significant amounts of water would be most desirable.

An object of this invention is to provide a process for the production of furan which provides high productivity using either dry furfural or furfural containing significant amounts of water.

Another object of this invention is to provide a process for decarbonylation of furfural in which furfural residues and catalyst residues remaining in the reactor can be removed from the reactor as a pumpable liquid after the productivity rate has dropped below a useful level.

A further object of this invention is to provide a novel process for the manufacture of furan which provides substantially quantitative yields.

Another object of this invention is to provide a liquid phase process for the production of furan from furfural which provides a high productivity rate using either dry furfural or furfural containing significant amounts of water.

These and other objects are obtained in accordance with this invention by contacting liquid furfural with a palladium catalyst in the presence of calcium acetate in an amount greater than about 0.01 mole per mole of liquid furfural.

The palladium catalyst used in the process of this invention is preferably supported on one of the many supports known in the art. The amount of palladium supported on the carrier is not critical. While a catalyst containing between about 5% and 10% by weight palladium as palladium metal is preferred, catalysts containing considerably more or less palladium are eminently satisfactory. The methods for producing a palladium catalyst are many and varied and are well known to the art. Any of these methods, except as otherwise indicated herein, may be used to prepare the catalyst used in this invention. For example, catalysts prepared by the technique reported in the above-cited reference by H. E. Eschinazi give good results. This Eschinazi technique involves the precipitation of palladium on the support in the form of compounds such as palladium oxide or hydroxide by the addition of sodium carbonate to an aqueous palladium salt. The deposited palladium compounds are converted to palladium metal on contact with furfural.

Unsupported and supported palladium compounds may also be reduced to palladium metal by any of the well-known procedures employed for this purpose.

Suitable catalyst supports include alumina, silica, carbon, barium sulfate, calcium carbonate, diatomaceous earth, etc. It is well known in the art that a small amount of acidity leads to formation of sludge, etc. in hot, liquid furfural systems. Hence it is obvious that the use of a supported palladium catalyst which is acidic, and the use of furfural containing acidic impurities, must be avoided.

The furfural employed should be relatively pure but may be wet (e.g. 1.5% water). Furfural can be purified by any of the well-known procedures employed for this purpose to provide the feed for the process of this invention. Fractional distillation and distillation after treatment with aqueous base are examples of these well-known procedures.

Calcium acetate provides a pH of about 7.3 when dissolved in neutral water at a concentration of 0.1% by weight based on the weight of solution. The calcium acetate monohydrate is the most commonly available form and is the preferred form of the additive. Other hydrated forms of calcium acetate provide eminently satisfactory results when used in accordance with the process of this invention. Hence it is unnecessary that any effort be expended to provide an additive substantially free of water. In fact the additive may be introduced into the system either as a solid, for example in the form of a slurry in which the dry powder is suspended in furfural, or in aqueous solution.

The preferred amount of calcium acetate is between about 0.01 and about 0.1 mole per mole of furfural. Larger amounts of calcium acetate may be used but are not necessary. Generally, calcium acetate should be present in an amount greater than about 0.01 mole per mole of furfural.

Hence in one embodiment of this invention furfural containing about 1.5% by weight based on the weight of the furfural of a 10% by weight palladium on alumina catalyst, and containing about 0.05 mole powdered calcium acetate monohydrate per mole furfural, is boiled in a system which includes an air-cooled reflux condenser which is of sufficient length to condense the furfural and return it to the reactor, while allowing the furan and carbon monoxide to pass overhead. An atmosphere of some inert gas should be used to blanket the system before the decarbonylation reaction is started. The furfural feed should be free of air oxidation products and of other acidic materials as well. As the reaction proceeds, the system's noncondensable atmosphere becomes substantially all carbon monoxide.

In a preferred embodiment of this invention the liquid furfural is maintained at a temperature above about 190° C. and below about 225° C. Temperatures above about 200° C. and below about 220° C. are more preferred. Generally, the production rate will increase as the temperature increases. Higher or lower temperatures may be used, of course. Insofar as the preferred temperature range is above the furfural atmospheric pressure boiling point (about 162° C.), superatmospheric pressures (e.g., about 25 to 100 pounds per square inch gauge pressure) are used in preferred embodiments. In addition to providing reflux temperatures in the desired range, superatmospheric pressures facilitate the condensation and separation of furan from the copious carbon monoxide gas stream. When furan is continuously distilled overhead and recovered, and furfural is fed to the reactor in such a manner as to maintain a substantially constant amount of furfural in the reactor, the process is an essentially continuous process.

As used herein, the term "productivity rate" is defined as the number of parts by weight of furan produced per part by weight of palladium per hour. The term "productivity" used herein in connection with the process of this invention is defined as parts by weight of furan actually produced per part by weight of palladium. The average productivity rate is determined by dividing the productivity by the number of hours required to achieve that productivity.

The invention is further illustrated by the following numbered examples in which all amounts are in parts by weight unless otherwise indicated. The particular calcium acetate used in these examples was a reagent grade monohydrate which, according to the manufacturer's batch analysis reported on the label, provided a pH of 7.3 in 5% aqueous solution at 25° C.

*Example 1*

Dry furfural (1000 parts) was charged to a stainless steel reactor fitted with a stirrer, a thermostatically controlled heater, a vertical distillation column, and a pressurized feed line which is opened and closed by an automatic device in such a manner that the furfural liquid level in the reactor is maintained substantially constant. A catalyst (16 parts of 5% palladium based on the weight of catalyst on alumina) was added to the furfural along with calcium acetate monohydrate (120 parts). The vertical distillation column was so arranged as to reflux furfural while permitting furan vapor to pass on to a hermetically joined furan condenser which dropped liquid furan into a hermetically joined product tank which, in turn, permitted the carbon monoxide gas to escape to a pressure-regulated vent valve. With the exception of the pressure-regulated vent, the entire system was hermetically sealed.

The reactor charge was heated and the temperature automatically controlled at about 215° C. The pressure-regulated vent valve was adjusted to maintain about 67 p.s.i.g. pressure in the system. Under these conditions furfural refluxed vigorously. Furan was produced and collected in the product tank. Changes in productivity rate, and hence changes in carbon monoxide production rate, were observed by means of a gas flowmeter located immediately downstream from the pressure-regulated vent valve. The productivity rate was also followed by observing the rate at which furfural was admitted to the system by the liquid level control device. As the furfural was consumed by the reaction, the liquid level tended to drop. However, the automatic liquid level control device then opened the pressurized feed line to admit some additional furfural and thereby maintained an approximately constant furfural liquid level in the reactor.

Furan production was permitted to continue until the productivity rate dropped to approximately 10% of the initial rate. The weight of the furan actually produced in the run divided by the actual weight of palladium used in the run gave a productivity of about 14,000.

Actual productivity values ranged between 13,000 and 15,500 in a series of six repeat tests under conditions identical to those above using different lots of dry furfural. In each case, liquid residue left in the reactor was readily pumped out, and most of the reactor residue was recovered as furfural upon distillation of the residue. Excluding the catalyst and salt additive, the nondistillable portion of the reactor residues in each test in this series ran less than 1% of the total furfural fed to the system throughout that test. If this loss is ignored, the yields of furan in terms of percent of the theoretical yield is substantially 100%. If this loss is taken into account the yields achieved in each of the above runs were about 99% of the theoretical yield or better. An average time of operation of 60 hours was required to achieve the average productivity of 14,360 in the above series of tests. Hence the average productivity rate was 240 parts furan per part palladium per hour for the "average" run.

*Example 2*

The procedure of Example 1 was repeated, except that the furfural feed contained 1% water by weight. The results were substantially the same as those obtained in Example 1. Eight repeat runs using different lots of furfural containing 1% water by weight gave productivities between 13,350 and 22,000. In this series of runs an average operating time of 58 hours was required to produce an average productivity of 17,690 parts furan per part palladium. Hence the average productivity rate for the average run of this series was 325 parts furan per part palladium per hour.

It is apparent from the above examples that the improved productivity of the process of this invention varied considerably in different runs even though identical procedures were followed. While we do not want to be bound by any theories, some of this variation seems to be attributable to the fact that different lots of furfural varied in purity. For example, during the course of our tests one procedure consistently gave actual productivities of about 15,000 using one lot of relatively pure furfural, and the same procedure consistently gave actual productivities of about 21,000 using a different lot of relatively pure furfural. We have been unable to establish what factors account for this difference by their presence (or absence).

However, while we recognize that some unknown factor, possibly associated with the degree of purity of the furfural, plays a role in determining the magnitude of increase in productivity achieved by the process of this invention, we have discovered that increased productivities are achieved in all cases by the process of this invention when relatively pure furfural is utilized.

*Example 3*

The procedure of Example 1 was repeated in a series of tests, except that in this series different temperatures and pressures were employed. In runs at 195° C. utilizing 37 p.s.i.g. pressure, and at 205° C. utilizing 51 p.s.i.g., the productivities obtained were about 15,000 and about 17,500, respectively. The productivity rate decreased as temperature decreased. At 225° C. utilizing 88 p.s.i.g. pressure, the average productivity rate throughout the entire run was higher than that obtained in Example 1 (i.e., about 350 parts furan per part palladium per hour), and the productivity was lower than that obtained in Example 1 (i.e., at 215° C.). In each of these runs of Example 3 the liquor residue was readily pumped from the reactor and the actual yield based on unrecovered furfural was about 99% of the theoretical, or better.

Example 4

The procedure of Example 2 was repeated twice, using two different lots of relatively pure furfural, except that a portion (40 parts) of calcium acetate was added at the begining of the run, and additional calcium acetate added every 5–6 hours. One run, which utilized a total of 140 grams of calcium acetate monohydrate, achieved a productivity of 23,200 in 71 hours. A second run, which utilized 100 grams of the calcium acetate, produced 15,060 grams furan per gram palladium in 46 hours. The average productivity rates for each of these runs was over 325 parts furan per part palladium per hour. In these runs the incremental addition of additive was accomplished by pumping a slurry of additive powder in furfural into the reactor by means of a liquid pump. In each of the runs the residue remaining in the reactor at the end of the run (i.e., when productivity rate fell to about 10% of the initial rate) was a readily pumpable liquid. The yields of furan were about 99% of the theoretical based on the unrecovered furfural, or better.

Example 5

To compare this invention with the prior art, the procedure of Example 1 was repeated, except that no calcium acetate was utilized. A productivity of 4,900 parts furan per part palladium was obtained.

Example 6

To further compare this invention with the prior art, the procedure of Example 2 was repeated, except that no calcium acetate was utilized. A productivity of 2,900 was obtained.

Example 7

To further compare this invention with the prior art, the procedure of Example 1 was repeated, except that no calcium acetate was employed, and instead, 16 parts of sodium carbonate were added at the start of the reaction. At 28½ hours of operation, 10 parts additional sodium carbonate were added to the reactor. The furan produced during 30 hours was equivalent to a productivity of 11,000. At about 35 hours, however, the productivity rate dropped rapidly, and by 39 hours no appreciable quantity of furan was being produced. Actual productivity to this point was about 13,000. The material remaining in the reactor was found to be a substantially solid, resinoid mass, which had to be chiseled and dug out of the reactor. No attempt was made to recover furfural from this resinoid mass. In this run, which utilized sodium carbonate and not calcium acetate, and hence was not an embodiment of this invention, the organic portion of the solid, resinoid material amounted to about 5% of the total furfural charged to the reactor throughout that continuous run.

We claim:
1. A process for production of furan comprising contacting liquid furfural with a palladium catalyst in the presence of calcium acetate in an amount greater than about 0.01 mole per mole of liquid furfural.
2. A process for production of furan comprising contacting liquid furfural with a palladium catalyst in the presence of calcium acetate, said calcium acetate being present in an amount greater than about 0.01 mole per mole furfural, said contacting taking place at a temperature above about 190° C. and below about 225° C.
3. A process for production of furan from wet liquid furfural comprising contacting said furfural with palladium catalyst in the presence of calcium acetate in an amount greater than about 0.01 mole per mole furfural, said contacting taking place at a temperature above about 190° C. and below about 225° C.
4. A process for production of furan comprising maintaining liquid furfural at a temperature above about 190° C. and below about 225° C. in the presence of calcium acetate in amount between about 0.01 mole and about 0.1 mole per mole of furfural, and in the presence of a palladium catalyst.
5. A process for producing furan comprising boiling liquid furfural which contains calcium acetate in an amount between about 0.01 and about 0.1 mole per mole of furfural, in the presence of a palladium catalyst, said liquid furfural being at a temperature greater than about 190° C. and below about 225° C.

References Cited by the Examiner
UNITED STATES PATENTS
3,007,941  11/1961  Copelin _____ 260—346.1

NICHOLAS S. RIZZO, *Primary Examiner.*

HENRY R. JILES, *Assistant Examiner.*